United States Patent [19]

Bradford et al.

[11] Patent Number: 5,412,071
[45] Date of Patent: May 2, 1995

[54] CATALYST COMPOSITION AND PROCESS FOR THE PREPARATION OF POLYMERS

[75] Inventors: Arleen M. Bradford; Andre Buys, both of Amsterdam, Netherlands

[73] Assignee: Shell Oil Company, Houston, Tex.

[21] Appl. No.: 319,903

[22] Filed: Oct. 7, 1994

[51] Int. Cl.6 ............... C08G 67/02; B01J 31/02; B01J 31/12
[52] U.S. Cl. .................. 528/392; 502/154; 502/162
[58] Field of Search ............... 528/392; 502/154, 162

[56] References Cited

U.S. PATENT DOCUMENTS

| 4,806,630 | 2/1989 | Drent | 528/392 |
|---|---|---|---|
| 4,808,699 | 2/1989 | Van Broekhoven | 528/392 |
| 4,831,113 | 5/1989 | Van Broekhoven | 528/392 |
| 4,851,379 | 7/1989 | Van Broekhoven | 502/154 |
| 5,314,856 | 5/1994 | Sommazzi | 502/167 |
| 5,324,701 | 6/1994 | Sommazzi | 502/167 |
| 5,352,767 | 10/1994 | Chien | 528/392 |

*Primary Examiner*—Vasu S. Jagannathan

[57] ABSTRACT

A catalyst composition useful in polymerizing carbon monoxide with one or more ethylenically unsaturated compounds is presented. The catalyst composition comprises a metal of Group VIII of the Periodic Table and an anion which is weakly or non-coordinating with the Group VIII metal and which includes an oxidant moiety in its molecular structure. A process for the preparation of copolymers catalyzed by this composition is also presented.

19 Claims, No Drawings

CATALYST COMPOSITION AND PROCESS FOR THE PREPARATION OF POLYMERS

FIELD OF THE INVENTION

The invention relates to catalysts and processes for the preparation of copolymers of carbon monoxide with one or more compounds comprising an ethylenically unsaturated bond.

BACKGROUND OF THE INVENTION

Linear copolymers of carbon monoxide and one or more ethylenically unsaturated compounds may be prepared by reacting the monomers under polymerization conditions with a catalyst system which comprises a Group VIII metal and a weakly or non-coordinating anion. The preparation of these copolymers may be carried out in the liquid phase. That is, the reaction can be conducted so that the continuous phase is formed by a liquid diluent such as a non-polymerizable liquid in which the catalyst dissolves but in which the formed copolymers are substantially insoluble. The recovery and purification of the product of such a process normally requires a filtration or centrifugation step. Moreover, a distillation step is usually required in order to recover pure diluent.

The preparation of the copolymers may also proceed in the gas phase. When this approach is taken the continuous phase is formed by gaseous carbon monoxide and possibly one or more of the other monomers if they are present in the gas phase under the prevailing polymerization conditions. The gas phase preparation of the copolymers is considered advantageous because product recovery is simpler than in the liquid phase process. The separation and purification steps inherent in the liquid phase process can also be omitted in gas phase production. This improves the economics of the process.

Considerable efforts have been made to increase the activity of the catalyst system. Some improvement has resulted from, for example, changing the reaction conditions or modifying the components participating in the catalyst. EP-A-239145 proposes an enhancement of catalytic activity by incorporating an oxidant such as a quinone in the catalyst system. Between about 1 and 10000 mol of quinone per gram atom of palladium are purportedly preferred with between about 10 and 100 mol per gram atom of palladium being set forth in the examples.

EP-A-272728 proposes that other oxidants are also suitable for enhancing the catalyst activity such as organic nitrites and nitro compounds. Quantities similar to those of the quinones are recited for the use such other oxidants. That is, large amounts of the oxidants are required.

Significant improvements in catalyst activity continue to be sought. Moreover, the art could benefit from such improvements particularly where the process occurs in the gas phase without large quantities of catalyst modifiers. Economically advantageous catalyst systems such as those which do not require separate or discrete additions of catalyst promoter are also needed.

SUMMARY OF THE INVENTION

A catalyst composition is presented herein comprising a metal of Group VIII of the Periodic Table, and an anion which is weakly or non-coordinating with the Group VIII metal and which includes an oxidant moiety in its molecular structure.

In one embodiment, the catalyst composition comprises a cobalt napthoquinone sulfonate.

This catalyst composition is particularly useful in the preparation of copolymers which comprises copolymerizing carbon monoxide with one or more ethylenically unsaturated compounds.

In one embodiment, the process is conducted in the gas phase.

DETAILED DESCRIPTION OF THE INVENTION

It has now been found that catalyst compositions comprising a weakly or non-coordinating anion which includes an oxidant moiety in its molecular structure increases the catalytic activity in the polymerization of carbon monoxide and one or more compounds having an ethylenically unsaturated bond well beyond catalyst activities obtained with previously used catalyst modifiers. This is particularly true in the case of gas phase polymerizations. These catalyst systems and processes do not require the use of a large amount of oxidant. Furthermore, polymers prepared using this catalyst composition and process possess a better thermal stability than polymers prepared using .the large amount of oxidant for enhancing the catalyst activity.

The invention thus relates to a catalyst composition comprising:
 a) a metal of Group VIII of the Periodic Table, and
 b) an anion which is weakly or non-coordinating with the Group VIII metal and which includes an oxidant moiety in its molecular structure.

The invention further relates to a process for the preparation of copolymers which comprises copolymerizing carbon monoxide with one or more ethylenically unsaturated compounds in the presence of a catalyst composition according to this invention.

The weakly or non-coordinating anion is typically an anion derived from an acid with a pKa of less than 6. An anion of an acid with a pKa of less than 2 is preferred. The anion may contain one or more anionic groups; one is preferred. The weakly or non-coordinating anion is preferably an anion derived from a sulfonic acid or a carboxylic acid. Phosphoric acids are also suitable sources of the weakly or non-coordinating anion.

The oxidant moiety may comprise an aromatic or (cyclo)aliphatic group to which one or more oxo, nitro or nitroso groups are attached. Suitably the oxidant moiety is selected from nitro groups, having groups such as nitrophenyl groups, 1,3-dinitrophenol groups, 4-isopropyl-1-nitrophenyl groups and nitropropyl groups. The corresponding weakly or non-coordinating anions are thus selected from 1,3-dinitrobenzenes, 4-isopropyl-1-nitrobenzenes and nitropropanes substituted with an appropriate anionic group.

Oxidant moleties from groups containing two carbonyl groups in conjugation with ethylenic and/or aromatic unsaturation as to form a quinone are preferred. 1,2- or 1,4-quinones are most preferred. In such cases the weakly or non-coordinating anion may be, for example, a 1,2- or 1,4-benzoquinone; a 1,2- or 1,4-naphthaquinone; or a 1,2-, 1,4- or 9,10-anthraquinone substituted with an appropriate anionic group.

Anionic groups from sulfonic acids are preferred. Very good results have been obtained with an anion derived from 9,10-anthraquinone-2,6-disulphonic acid, and in particular 1,2-naphthoquinone-4-sulfonic acid, 1,4-naphthoquinone-2-sulfonic acid and 9,10-anthraquinone-2-sulfonic acid.

The weakly or non-coordinating anion may be incorporated in the catalyst composition of the invention in the form a salt, typically a cobalt salt, or in the form of an acid. If desired, the anion may be incorporated simultaneously with the Group VIII metal, e.g. as a complex in which the metal and the anion participate. An example is the complex $Pd(CH_3CN)_2(1,2\text{-naphthoquinone-4-sulphonate})_2$ which can be prepared by reacting palladium chloride with the silver salt of 1,2-naphthoquinone-4sulfonic acid in acetonitrile as solvent.

The amount of the weakly or non-coordinating anion present in the catalyst compositions of this invention is typically in the range of from 0.5 to 20 mol per gram atom of Group VIII metal, preferably from 1.0 to 10 mol per gram atom of Group VIII metal and most preferably from 1.5 to 5 mol per gram atom of Group VIII metal.

The metals of Group VIII include the noble metals ruthenium, rhodium, palladium, osmium, iridium and platinum as well as iron, cobalt and nickel. Mixtures of Group VIII metals may also be used. Among the group VIII metals, palladium, rhodium and nickel are preferred. Palladium is most preferred.

Metal salts are ordinarily used for incorporating the Group VIII metal(s) in the catalyst system. A metal salt of a carboxylic acid such as acetic acid is preferred.

It is also preferred that the catalyst composition comprises a ligand capable of complexing with the Group VIII metal via one or more atoms of the ligand selected from phosphorus, arsenic, antimony, sulphur and nitrogen atoms.

Suitable ligands include monodentate ligands, bidentate ligands and polydentate ligands. Bidentate ligands, in particular those which are capable of complexing with the Group VIII metal via two atoms of the ligand selected from phosphorus, sulphur and nitrogen atoms, are preferred.

Preferred nitrogen bidentates are compounds of the general formula

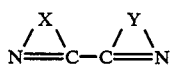 (I)

wherein X and Y represent organic bridging groups containing three or four bridging atoms, two of which are carbon atoms. Such preferred bidentates include, for example, 2,2'-bipyridine and 1,10-phenanthroline.

Preferred sulphur bidentates are compounds of the general formula $R_1S\text{-}R\text{-}SR_2$ wherein R represents a bivalent organic bridging group containing at least two carbon atoms in the bridge and each of $R_1$ and $R_2$ independently represents an optionally substituted hydrocarbyl group, such as 1,2-bis(ethylthio)ethane and cis-1,2-bis(benzylthio)ethene.

Preferred phosphorus bidentates are compounds of the general formula $R^1R^2P\text{-}R\text{-}PR^3R^4$ (II)

wherein R has the previously established meaning and each of $R_1$, $R_2$, $R_3$ and $R_4$ independently represents a substituted or non-substituted hydrocarbyl group. $R_1$, $R_2$, $R_3$ and $R_4$ may be the same or different, optionally substituted, aliphatic, cycloaliphatic or aromatic groups. Aromatic groups substituted by one or more polar groups are preferred. Compounds of formula (II) wherein each of $R_1$, $R_2$, $R_3$ and $R_4$ represents a phenyl group comprising an alkoxy group containing up to 4 carbon atoms at one or both orthopositions with respect to the phosphorus atom to which the phenyl group is linked are especially preferred.

Examples of suitable phosphorus containing bidentate ligands are 1,2-bis (diphenylphosphino) ethane, 1,3-bis (diphenylphosphino)-propane, 1,3-bis[bis(2-methoxyphenyl)phosphino]propane and 1,3-bis[bis (2, 6-dimethoxyphenyl) phosphino]propane.

In general, it is preferred that the bidentate ligand be present in the catalyst system in the range of between about 0.5 to 100 mol per gram atom of Group VIII metal. It is even more preferred that the bidentate ligand is present in a range of between about 1 to 50 mol per gram atom of Group VIII metal. However, if the catalyst system comprises a phosphorus bidentate ligand of formula (II), the preferred amount of ligand is then in the range of about 0.5 to 2.0 and more preferably in the range of about 0.75 to 1.5 mol per gram atom of Group VIII metal.

When the process of this invention is carried out as a gas phase process the catalyst composition is best used as a supported catalyst. That is, the catalyst composition is deposited on a support or carrier material. The support may be inorganic such as silica, alumina, talc or charcoal. Alternatively organic supports may be used such as cellulose, dextrose or dextran gel. Supports which are substantially comprised of a porous material are preferred such as a carrier material having a pore volume of at least 0.01 cm$^3$ per gram as determined by mercury porosimetry.

Polymeric materials such as polyethylene, polypropylene, polyoxymethylene and polystyrene comprise some very suitable supports. Mixed materials such as polymer impregnated silicas may also be used.

A preferred carrier material is a linear alternating copolymer of carbon monoxide with one or more ethylenically unsaturated compounds. A copolymer which as regards structure and composition is substantially the same as the copolymer to be prepared in the process of the invention is a most preferred carrier.

The preparation of the catalyst system may conveniently be carried out in a separate step preceding the process of the invention, e.g. by combining the catalyst components. Impregnating the carrier material with a solution or suspension of the catalyst components or precursors thereof can also be conducted to prepare the catalyst system. Further, the various catalyst components may be added to the carrier material together or separately.

Ethylenically unsaturated compounds which can be used as starting materials in the copolymerization process of the invention include compounds consisting exclusively of carbon and hydrogen. Compounds which also comprise one or more hetero-atoms such as unsaturated esters may also be used as starting materials. Unsaturated hydrocarbons are preferred ethylenically unsaturated compounds. Examples include lower olefins such as ethene, propene and 1-butene, cyclic compounds such as cyclopentene and aromatic compounds such as styrene and alpha-methylstyrene. Ethene, propene or a mixture of ethene and propene are the most preferred ethylenically unsaturated compounds.

The molar ratio between the monomers (ie., carbon monoxide and the ethylenically unsaturated compound(s)) is generally in the range of about 5:1 to 1:5.

Preferably the molar ratio is in the range of about 2:1 to 1:2, for example when the monomers are in substantially equimolar amounts.

When the process of this invention is carried out as a gas phase process it is preferably carried out with addition of a small quantity of a volatile protic liquid such as a lower aliphatic alcohol. Such alcohols typically have up to 4 carbon atoms and/or hydrogen. The quantity of this liquid is sufficiently small so that under the polymerization conditions the liquid is substantially in the gas phase. A suitable quantity may be 40–60% by weight, relative to the quantity which is sufficient to saturate the gas cap under the conditions of the polymerization.

When the copolymerization process is carried out as a liquid phase process a diluent is preferably used in which the catalyst composition is soluble and in which the formed copolymer product is substantially insoluble. Preferred diluents are volatile protic liquids comprising a lower alcohol having up to 4 carbon atoms. Methanol is a most preferred diluent.

The preparation of the copolymers is preferably carried out at a temperature in the range of between about 20° to 200° C., although the use of a reaction temperature outside that range is not precluded. The most preferred reaction temperature is between about 25° to 150° C. Suitable pressures generally are within the range of about 1 to 200 bar, but preferably the pressure is in the range of about 2 to 150 bar.

The quantity of catalyst used in the process of this invention can vary within wide limits. Per mol of ethylenically unsaturated compound to be polymerized, a quantity of catalyst is preferably used which contains $10^{-7}$–$10^{-3}$ and in particular $10^{-6}$–$10^{-4}$ gram atom Group VIII metal.

The copolymers obtained according to the invention can be processed into shaped articles, films, sheets, fibers and the like. They exhibit good mechanical properties and are hence suitable for a variety of commercially interesting applications. Such applications include, for example, automobile parts and packaging materials for food and drinks.

The invention will be further illustrated by the following examples. In each example, $C^{13}$-NMR analysis established that the carbon monoxide/ethene copolymers prepared had linear chains in which the units originating from carbon monoxide were alternating with the units originating from ethene.

EXAMPLE 1 (COMPARATIVE)

A carbon monoxide/ethene copolymer was prepared as follows.

A catalyst was prepared by absorbing a catalyst solution containing 0.25 ml tetrahydrofuran, 3.75 ml methanol, 0.01 mmol palladium acetate, 0,011 mmol 1,3-bis[-bis(2-methoxyphenyl) phosphino]propane and 0.05 mmol p-toluenesulphonic acid on 8 g of a linear alternating terpolymer of carbon monoxide with ethene and propene.

The catalyst thus prepared was introduced into a 500-ml autoclave provided with a mechanical stirrer. After the autoclave was closed and the air therein was replaced by 1 bar carbon monoxide, 20 bar carbon monoxide was forced in, followed by 20 bar ethene. The autoclave contents were brought to a temperature of 90° C. and the pressure was maintained by forcing in a 1:1 (v/v) carbon monoxide/ethene mixture. After 5 hours the polymerization was terminated by releasing the pressure and cooling the reaction mixture to room temperature.

The polymerization rate was calculated from the consumption of the carbon monoxide/ethene mixture used to maintain the pressure. The rate found after 1 hour polymerization time (an approximation of the initial rate), the rate found after 4 hours and the average rate over the entire period of 5 hours have been given in Table I. The quantity of copolymer obtained was in agreement with the average polymerization rate.

EXAMPLES 2–7

Carbon monoxide/ethene copolymers were prepared in substantially the same way as in Example 1, but with the difference that 0.05 mmol of one of the sulfonic acids or cobalt sulphonates mentioned in Table I were used, instead of p-toluenesulphonic acid.

The polymerization rates were as indicated in Table I. The quantities of the copolymers obtained were in agreement with the average polymerization rates.

These examples illustrate that catalysts made according to the instant invention display significantly greater activity than has been previously seen.

EXAMPLES 8 AND 9 (COMPARATIVE)

Carbon monoxide/ethene copolymers were prepared in substantially the same way as in Example 1, but with the difference that the catalyst solution contained, as an additional compound, 1,4-naphthoquinone. The quantity of 1,4-naphthoquinone was 0.05 mmol in Example 8 and 0.5 mmol in Example 9.

The polymerization rates were as indicated in Table I. The quantities of the copolymers obtained were in agreement with the average polymerization rates.

TABLE I

| Example | Sulfonic acid or cobalt sulphonate | Polymerization rates (kg copolymer/g Pd · h) | | |
|---|---|---|---|---|
| | | After 1 h | After 4 h | Average over 5 h |
| 1[1] | p-toluenesulphonic acid | 1.8 | 1.8 | 1.8 |
| 2 | 1,2-naphthoquinone-4-sulfonic acid | 8.2 | 14.5 | 10.7 |
| 3 | 9,10-anthraquinone-2-sulfonic acid | 6.4 | 16.6 | 10.4 |
| 4 | cobalt 1,2-naphtho-quinone-4-sulphonate | 15.3 | 15.9 | 15.1 |
| 5 | cobalt 1,4-naphtho-quinone-2-sulphonate | 12.3 | 12.3 | 12.3 |
| 6 | cobalt 9,10-anthra-quinone-2-sulphonate | 4.8 | 8.0 | 5.9 |
| 7 | cobalt 9,10-anthra-quinone-2,6-disulphonate | 4.5 | 4.5 | 4.2 |
| 8[1,2] | p-toluenesulphonic acid | 2.3 | 2.3 | 2.3 |
| 9[1,3] | p-toluenesulphonic acid | 2.9 | 2.9 | 2.9 |

[1] for comparison; not according to the invention
[2] 0.05 mmol naphthoquinone was present
[3] 0.5 mmol naphthoquinone was present

EXAMPLE 10 (COMPARATIVE)

A carbon monoxide/ethene copolymer was prepared as follows. A 300-ml autoclave provided with a mechanical stirrer was charged with 130 ml methanol and 2.7 g of a linear alternating terpolymer of carbon monoxide with ethene and propene. A catalyst solution prepared by combining 0.13 ml tetrahydrofuran, 0.88 ml methanol, 0.005 mmol palladium acetate, 0.0055 mmol 1,3-bis[bis(2-methoxyphenyl)phosphino]propane and 0.025 mmol p-toluenesulphonic acid was added.

After the autoclave was closed and the air therein was replaced by 1 bar carbon monoxide, 25 bar carbon monoxide was forced in, followed by 25 bar ethene. The autoclave contents were brought to a temperature of 85° C. and the pressure was maintained by forcing in a 1:1 (v/v) carbon monoxide/ethene mixture. After 2.5 hours the polymerization was terminated by releasing the pressure and cooling the reaction mixture to room temperature. The copolymer was filtered off, washed with methanol and dried at 70° C.

Eleven (11) g of copolymer was obtained, from which an average polymerization rate of 6 kg copolymer/(g Pd.hour) was calculated.

EXAMPLE 11

A carbon monoxide/ethene copolymer was prepared in substantially the same way as in Example 11, but with the difference that 0.025 mmol of 1,2-naphthoquinone-4-sulfonic acid was used, instead of p-toluenesulphonic acid.

20 g of copolymer was obtained. The average polymerization rate was 13 kg copolymer/(g Pd.hour).

This example further illustrates the improved activity with the catalyst system of the instant invention.

We claim as our invention:

1. A catalyst composition comprising
   a) a metal of Group VIII of the Periodic Table, and
   b) an anion which is weakly or non-coordinating with the Group VIII metal and which includes an oxidant moiety in its molecular structure.

2. The catalyst composition of claim 1 wherein said weakly or non-coordinating anion is an anion of an acid with a pKa of less than 2.

3. The catalyst composition of claim 2 wherein said acid is selected from the group consisting of sulfonic and carboxylic acids.

4. The catalyst composition of claim 2 wherein said weakly or non-coordinating anion is an anion derived from 9,10-anthraquinone-2,6-disulphonic acid, 1,2-naphthoquinone-4-sulfonic acid, 1,4-naphthoquinone-2-sulfonic acid or 9,10-anthraquinone-2-sulfonic acid.

5. The catalyst composition of claim 1 wherein said oxidant moiety of the weakly or non-coordinating anion is selected from groups containing two carbonyl groups in conjugation with ethylenic unsaturation.

6. The catalyst composition of claim 1 wherein said oxidant moiety of the weakly or non-coordinating anion is selected from groups containing two carbonyl groups in conjugation with aromatic unsaturation.

7. The catalyst composition of claim 1 wherein said oxidant moiety is selected from group consisting of a 1,2-quinones and 1,4-quinones.

8. The catalyst composition of claim 1 wherein said weakly or non-coordinating anion is present in the range of from 1.0 to 10 mol per gram atom of Group VIII metal.

9. The catalyst composition of claim 8 wherein said weakly or non-coordinating anion is present in the range of from 1.5 to 5 mol per gram atom of Group VIII metal.

10. The catalyst composition of claim 1 further comprising a ligand capable of complexing with the Group VIII metal via one or more atoms of the ligand selected from the group consisting of phosphorus, arsenic, antimony, sulphur and nitrogen atoms.

11. The catalyst composition of claim 10 wherein said ligand is represented by the formula;

$$R_1R_2P\text{-}R\text{-}PR_3R_4$$

wherein each of $R_1$, $R_1$, $R_3$ and $R_4$ is a substituted or non-substituted hydrocarbyl group and R is a bivalent organic bridging group having at least two carbon atoms in said bridge.

12. The catalyst composition of claim 11 wherein each of $R_1$, $R_2$, $R_3$ and $R_4$ is a phenyl group comprising an alkoxy group in one or both ortho-positions with respect to the phosphorus atom to which said phenyl group is linked.

13. The catalyst composition of claim 1 deposited on a support.

14. The catalyst composition of claim 13 wherein said support is substantially a porous carrier material which is a copolymer of carbon monoxide with one or more ethylenically unsaturated compounds.

15. A process for the preparation of copolymers which comprises copolymerizing carbon monoxide with one or more ethylenically unsaturated compounds in the presence of a catalyst composition comprising;
   a) a metal of Group VIII of the Periodic Table, and
   b) an anion which is weakly or non-coordinating with the Group VIII metal and which includes an oxidant moiety in its molecular structure.

16. The process of claim 15 carried out in the gas phase.

17. The process of claim 15 wherein said ethylenically unsaturated compound is selected from the group consisting of ethene and a mixture of ethene and propene.

18. The process of claim 17 wherein the copolymerization is carried out at between 25° and 150° C., at a pressure between 2 and 150 bar.

19. The process of claim 17 wherein the molar ratio between said ethylenically unsaturated compound (s) and carbon monoxide is between 5:1 and 1:5 and wherein a quantity of catalyst is used which contains between $10^{-6}$ and $10^{-4}$ gram atom Group VIII metal per mol of ethylenically unsaturated compound to be polymerized.

* * * * *